July 9, 1968   E. P. FUNKE   3,391,591
PROFILE IRON SHEARS
Filed Jan. 10, 1966   2 Sheets-Sheet 2
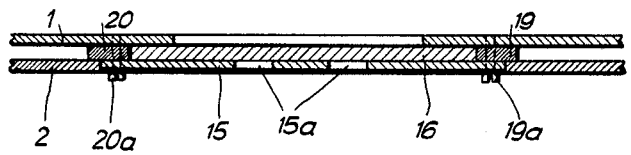
Fig. 3
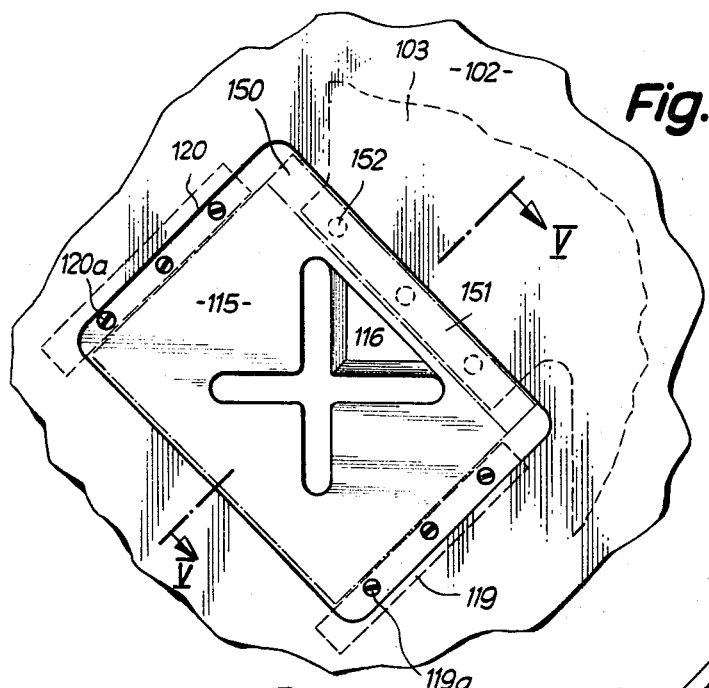
Fig. 4
Fig. 5
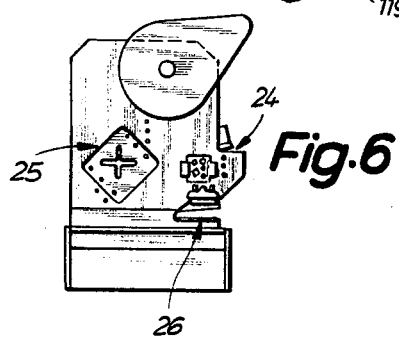
Fig. 6
INVENTOR.
Emil P. Funke
BY

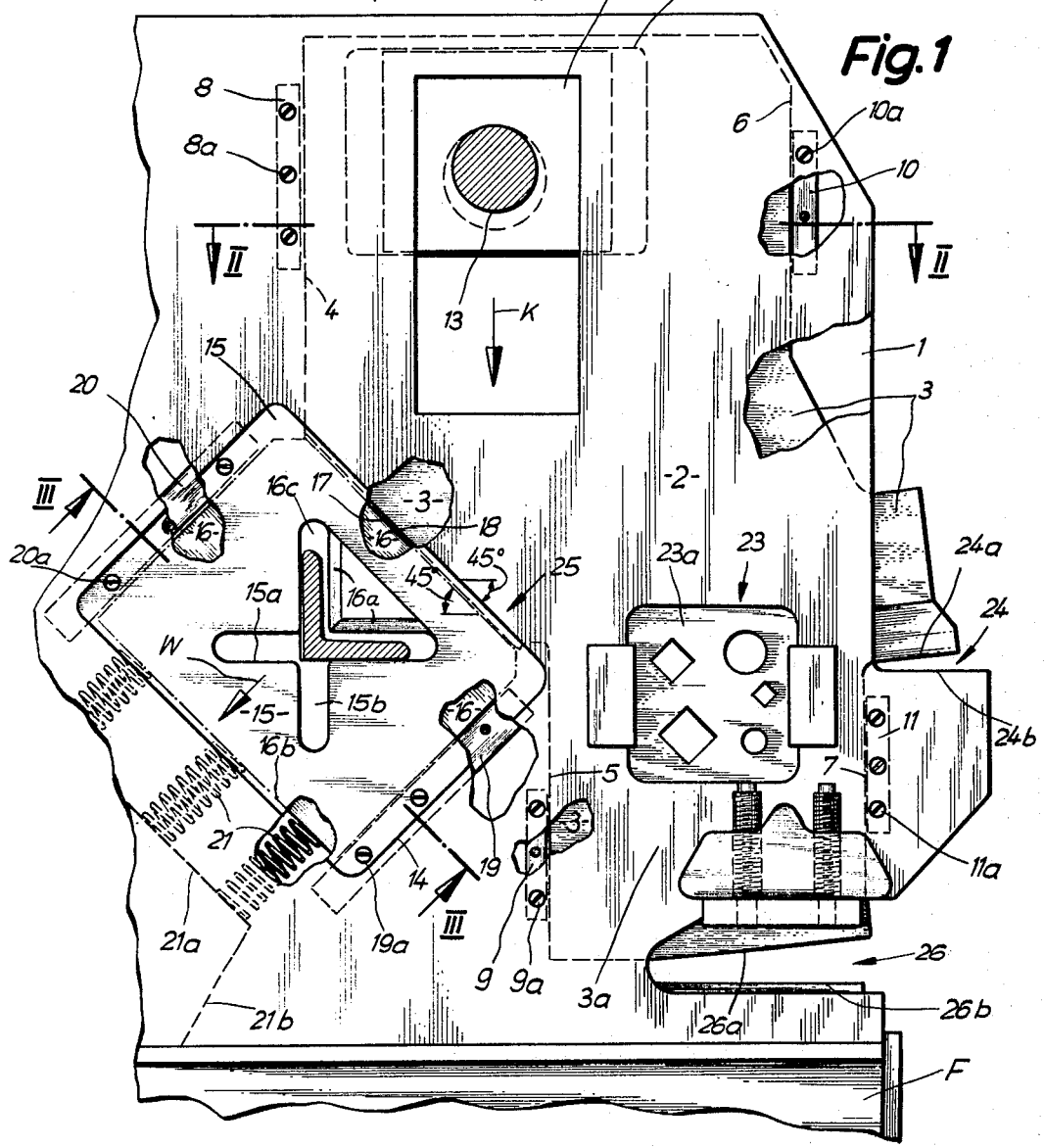

United States Patent Office 3,391,591
Patented July 9, 1968

3,391,591
PROFILE IRON SHEARS
Emil P. Funke, Gevelsberg, Germany, assignor to Paul Ferd Peddinghaus, Gevelsberg, Westphalia, Germany
Filed Jan. 10, 1966, Ser. No. 519,604
Claims priority, application Germany, Jan. 12, 1965, P 35,853
3 Claims. (Cl. 83—197)

ABSTRACT OF THE DISCLOSURE

Metal cutting shears having a frame with a main shear blade reciprocably guided in the frame and a second shearing blade mounted in the frame for movement at an angle to the main blade. The main blade has an inclined edge for engagement with an edge of the second shearing blade so that when the main blade is actuated the second blade is also actuated and with means to return the second blade when the first blade retracts in the form of springs acting on the second blade or of a hook-like connection between the first and second blades.

---

The present invention relates to profile iron shears with rod steel shears and other shearing means in which the knife plate carrying the movable profile knife is adapted to slide in a vertical plane at an angle of 45° on inclined surfaces of the shear frame and of the vertically movable shear carriage.

With heretofore known profile iron shears of the type involved as disclosed for instance in German Patent No. 802,675, the vertically movable shear carriage has a width which corresponds to the diagonal of the four-corner knife plate. This entails a considerable mass which is to be moved upwardly and downwardly during the cutting operation. An additional broadening of the shear carriage, for instance the rod steel shear at the same level as the profile shear and another shearing device, is prohibitive because, to this end, it would be necessary to further broaden the knife carriage which in turn would still further increase the weight of the knife carriage. Therefore, the rod steel shears were heretofore arranged always below the profile shears which arrangement, however, is awkward inasmuch as the mouth of the shears of the rod steel shears was located at an unfavorable working level between the profile shears and the sheet metal shears at the lower end of the shear carriage.

It is, therefore, an object of the present invention to provide profile iron shears of the type set forth above, which will overcome the drawbacks outlined above.

Another object of this invention consists in the improvement of heretofore known profile shears of the type involved in order to reduce the movable mass and also with regard to the arrangement of the rod steel shears.

It is still another object of this invention to provide an arrangement of the above mentioned type in which the rod steel shears are arranged as far as possible at a level which corresponds to the level of the profile iron shears and a further shear or notching device.

Heretofore known shears with this cutting arrangement required two separate shear carriages or driving devices such as clutches, gears etc. for driving the profile iron cutting device and the rod steel cutting device. Therefore, it is also an object to considerably simplify the manufacture of and to reduce the driving elements.

These and other objects and advantages of the present invention will appear more clearly from the following specification in connection with the accompanying drawings, in which:

FIG. 1 illustrates one embodiment of the present invention according to which the knife plate is returned to its starting position by spring force.

FIGS. 2 and 3 are sections along the lines II—II and III—III of FIG. 1.

FIG. 4 diagrammatically illustrates another embodiment of the invention according to which the knife plate is connected to the shear carriage.

FIG. 5 is a section along the line V—V of FIG. 2.

FIG. 6 is a side view of the shear according to the invention.

Profile iron shears according to the present invention are characterized primarily in that the inclined sliding surface of the shear carriage, which surface engages the movable knife plate, extends between two vertical lateral edges of said carriage while said edges are offset relative to each other, and are further characterized in that the rod steel shears are arranged at the level or approximately at the level of a further shear or notching device and of the profile iron knife in a section of the knife which is located laterally adjacent the lower side edge, while the knife plate is returned to its starting position by the shear carriage by means of spring pressure or in a manner known per se. The sheet metal shears are arranged in that knife carriage section which is located laterally adjacent the lower side edge below the rod steel shears.

With heretofore known and above referred to profile iron shears, the return stroke of the knife plate is effected by means of a pin on the knife carriage which engages the lower inclined edge of the knife plate and takes the same along.

With the arrangement according to the present invention, the return stroke is effected either by springs which are provided between the shear frame and the knife plate, or the knife carriage at its sliding surface grasps by means of a bar of hook-shaped cross section over a corresponding rail on the knife plate.

Referring now to the drawing in detail, the arrangement shown therein comprises two vertical plates 1, 2 of the shear frame F arranged parallel and in a certain distance to each other, while between said plates 1, 2 there is guided a plate-like shear carriage or slide 3. The said carriage or slide 3 has a side or lateral edge 4, a further side or lateral edge 5 parallel but laterally offset with regard to edge 4, lateral edges 6 and 7, a lower edge 26a and a middle edge 24a. The lateral edges of the carriage or slide are guided by guiding members 8, 9, 10, 11 fastened to the plates 1, 2 by bolts 8a, 9a, 10a, 11a so that the knife carriage is movable in a vertical plane between plates 1, 2 in upward and downward direction. The drive is effected in a manner known per se by means of an eccentric drive 13 with corresponding clutch, which drive acts upon a slide 13a which is guided in a window 12.

In the shear frame plate 2 which faces the viewer there is inserted in a hole 14 a plate 15 which extends in the plane of the plate 2 and carries the stationary knife represented by the edges 15 of the crosslike arranged hole 15b or by separate knives fixed to the plate. In the space between the stationary plates 1 and 2 and 15 respectively there is arranged a movable knife plate 16 with a rectangular hole 16c forming knife edges 16a. The edge 17 of the plate 16 engages a lateral edge 18 of the carriage or slide 3 extending in the same direction as the edge 17 and sliding thereon. Edge 18 extends between the lateral edges 4 and 5 of carriage or slide 3. The movable knife plate 16 is slidably guided by guiding means 19, 20 in a vertical plane at an angle of approximately 45°. Plate 15 and guiding means 19 and 20 are fastened to the plate 1 by bolts 19a, 20a. When slide 3 is moved downwardly in the direction of the arrow K, edges 17 and 18 slide along each other, and the movable knife plate 16 is moved in the direction of the arrow W whereby the knife arranged thereon or formed thereby will in cooperation with the knife of stationary plate 15 effect a cut. During the upward return stroke of the knife carriage, springs 21 press the edge 17 of the knife plate 16 against the edge 18 of the shear slide 3 so that the knife plate 16 will now be pressed in a direction opposite to the direction of the arrow W.

In the lower portion 3a of the carriage or slide 3, which is located adjacent the lateral edges 5 and 7 there are provided in known manner rod steel knives forming with the knife plate 23a inserted in a hole of the plate 2 the rod steel shears 23 so that the profile shears 25 formed primarily by parts 15 and 16 will be located at approximately the same working level as the shear mechanism 24, which may be a notching device, and the shears 23. The device 24 is known per se and comprises the middle edge 24a of the carriage or slide 3 and edges 24b of each of the plates 1 and 3. This greatly facilitates the introduction of work pieces to be cut into each of these devices. Below the rod steel shears 23 there are provided the sheet metal shears 26. With the upper knife edge 26a of the carriage or slide 3 and the counter-knives 26b of the plates 1, 2. A comparison of the arrangement according to the present invention with heretofore known profile shears will show that in spite of the reduced width of the knife slide and thus in spite of the reduced movable mass, the rod steel shear 23 and the shear notching mechanism 24 are arranged in approximately the same comfortable level as the profile shear 25.

The knife plate 16 is pushed against the slide or carriage 3 by springs 21 between the lower edge 16b of the plate 16 and the upper surface 21a of a platelike part 21b.

According to the embodiment of FIG. 4, the shear slide 103 between the plates 101, 102 is provided with a rail 151 which has a hook-shaped cross section and catches over a rail 150 of the knife plate 116. By means of screws 152 the two rails 150 and 151 are connected. knife plate 116 is guided by guiding means 119, 120 secured to the rearward plate 101 by bolts 119a, 120a.

It is, of course, to be understood that the present invention is, by no means, limited to the particular arrangements shown in the drawing but also comprises any modifications within the scope of the appended claims.

What I claim is:

1. Profile metal cutting shears which include: a shear frame having two spaced parallelly arranged substantially vertical frame plates, a shear slide vertically movably arranged between said frame plates and having a plurality of spaced parallel lateral edges extending in and offset relative to each other in substantially vertical direction, driving means drivingly connected to said shear slide for reciprocating the same in vertical direction, a stationary knife supported by said frame, a movable knife for cooperation with said stationary knife, said movable knife being supported by said shear frame and being in slidable engagement therewith, first inclined surface means forming part of said shear slide and engaging an edge of said moveable knife, second inclined surface means forming part of said shear frame and located in a vertical plane while extending at an acute angle with regard to a horizontal plane and guidingly engaging other edges of said moveable knife, said first and said second inclined surface means forming an angle with each other, said first and second inclined surface means being in sliding engagement with said movable knife and being operable in response to the movement of said shear slide in vertical direction to bring about movement of said movable knife in a direction which is the resultant of the simultaneous sliding movement of said knife plate along said first and said second inclined surface means, said first inclined surface means extending between two of said lateral edges of said shear slide, spring means continuously urging said movable knife away from said stationary knife, and rod steel shears and other shear means arranged at approximately the same level as said stationary and movable knives.

2. Profile shears according to claim 1, which includes sheet metal shears arranged below said rod steel shears and laterally of and adjacent to one of said lateral edges.

3. Profile shears according to claim 1, in which said first inclined surface means of said shear slide has associated therewith first rail means of hook-shaped cross section, and in which said movable knife has associated therewith second rail means slidably engaged by said first rail means.

References Cited
UNITED STATES PATENTS

| | | | |
|---|---|---|---|
| 1,091,668 | 3/1914 | Koehl | 83—627 X |
| 1,389,878 | 9/1921 | Kraut | 83—620 |
| 2,728,391 | 12/1955 | Peddinghaus et al. | 83—198 |

ANDREW R. JUHASZ, *Primary Examiner.*